US009629218B1

(12) United States Patent
Del Carmen, Jr.

(10) Patent No.: US 9,629,218 B1
(45) Date of Patent: Apr. 18, 2017

(54) THERMAL PROTECTION FOR LED BLEEDER IN FAULT CONDITION

(71) Applicant: Power Integrations, Inc., San Jose, CA (US)

(72) Inventor: Jose Requinton Del Carmen, Jr., San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/980,180

(22) Filed: Dec. 28, 2015

(51) Int. Cl.
*H05B 37/02* (2006.01)
*H05B 33/08* (2006.01)

(52) U.S. Cl.
CPC ..... *H05B 33/0884* (2013.01); *H05B 33/0809* (2013.01); *H05B 37/0227* (2013.01)

(58) Field of Classification Search
CPC ............ H05B 33/0815; H05B 33/0839; H05B 33/0878; H02H 5/042
USPC ...... 315/209 R, 291, 308, 309; 361/103, 106
See application file for complete search history.

(56) References Cited

U.S. PATENT DOCUMENTS

| | | |
|---|---|---|
| 3,740,581 A | 6/1973 | Pfiffner |
| 4,777,580 A | 10/1988 | Bingham |
| 4,866,585 A | 9/1989 | Das |
| 4,871,686 A | 10/1989 | Davies |
| 4,875,151 A | 10/1989 | Ellsworth et al. |
| 4,972,237 A | 11/1990 | Kawai |
| 4,982,260 A | 1/1991 | Chang et al. |
| 5,008,794 A | 4/1991 | Leman |
| 5,072,268 A | 12/1991 | Rumennik |
| 5,164,891 A | 11/1992 | Keller |
| 5,258,636 A | 11/1993 | Rumennik et al. |
| 5,274,259 A | 12/1993 | Grabowski et al. |

(Continued)

FOREIGN PATENT DOCUMENTS

| | | |
|---|---|---|
| EP | 0975024 | 1/2000 |
| JP | 2003142698 | 5/2003 |

OTHER PUBLICATIONS

Popa et al., "Optimal Curvature-Compensated BiCMOS Bandgap Reference". Image and Signal Processing and Analysis, 2001, pp. 507-510, Fig. 2.

(Continued)

*Primary Examiner* — Thuy Vinh Tran
(74) *Attorney, Agent, or Firm* — The Law Offices of Bradley J. Bereznak

(57) ABSTRACT

A bleeder circuit for use with a driver circuit having input circuitry that receives an ac input signal and outputs a rectified voltage signal at a positive terminal. The driver circuit further including converter and output circuitry operably coupled to a plurality of light-emitting diodes (LEDs). The bleeder circuit including a first resistor having a first terminal coupled to the positive terminal, and a heat sensor positioned to detect an increase in temperature of the first resistor. The heat sensor produces a heat sense signal in response to the temperature increase. A bleeder heat controller is coupled to receive the heat sense signal and produce a heat control signal in response thereto. A switching device controls a bleeder current flowing through the first resistor. The switching device receives the heat sense signal, which turns the switching device off when the temperature of the first resistor exceeding a predetermined threshold.

10 Claims, 6 Drawing Sheets

(56) References Cited

U.S. PATENT DOCUMENTS

| | | |
|---|---|---|
| 5,282,107 A | 1/1994 | Balakrishnan |
| 5,285,367 A | 2/1994 | Keller |
| 5,313,082 A | 5/1994 | Eklund |
| 5,323,044 A | 6/1994 | Rumennik et al. |
| 5,411,901 A | 5/1995 | Grabowski et al. |
| 5,510,972 A | 4/1996 | Wong |
| 5,612,567 A | 3/1997 | Baliga |
| 5,850,337 A | 12/1998 | Lee |
| 5,880,942 A | 3/1999 | Leu |
| 5,969,566 A | 10/1999 | Weber et al. |
| 6,084,277 A | 7/2000 | Disney et al. |
| 6,157,049 A | 12/2000 | Mitlehner et al. |
| 6,168,983 B1 | 1/2001 | Rumennik et al. |
| 6,207,994 B1 | 3/2001 | Rumennik et al. |
| 6,252,288 B1 | 6/2001 | Chang |
| 6,366,485 B1 | 4/2002 | Fujisawa |
| 6,424,007 B1 | 7/2002 | Disney |
| 6,445,600 B2 | 9/2002 | Ben-Yaakov |
| 6,465,291 B1 | 10/2002 | Disney |
| 6,468,847 B1 | 10/2002 | Disney |
| 6,489,190 B2 | 12/2002 | Disney |
| 6,501,130 B2 | 12/2002 | Disney |
| 6,504,209 B2 | 1/2003 | Disney |
| 6,509,220 B2 | 1/2003 | Disney |
| 6,549,439 B1 | 4/2003 | Yu |
| 6,552,597 B1 | 4/2003 | Disney |
| 6,555,873 B2 | 4/2003 | Disney et al. |
| 6,555,883 B1 | 4/2003 | Disney et al. |
| 6,563,171 B2 | 5/2003 | Disney |
| 6,570,219 B1 | 5/2003 | Rumennik et al. |
| 6,573,558 B2 | 6/2003 | Disney |
| 6,577,512 B2 | 6/2003 | Tripathi et al. |
| 6,583,663 B1 | 6/2003 | Disney |
| 6,633,065 B2 | 10/2003 | Rumennik et al. |
| 6,635,544 B2 | 10/2003 | Disney |
| 6,639,277 B2 | 10/2003 | Rumennik et al. |
| 6,661,276 B1 | 12/2003 | Chang |
| 6,667,213 B2 | 12/2003 | Disney |
| 6,680,646 B2 | 1/2004 | Disney |
| 6,724,041 B2 | 4/2004 | Rumennik et al. |
| 6,724,244 B2 | 4/2004 | Wu |
| 6,730,585 B2 | 5/2004 | Disney |
| 6,734,461 B1 | 5/2004 | Shiomi et al. |
| 6,734,714 B2 | 5/2004 | Disney |
| 6,750,105 B2 | 6/2004 | Disney |
| 6,759,289 B2 | 7/2004 | Disney |
| 6,768,171 B2 | 7/2004 | Disney |
| 6,768,172 B2 | 7/2004 | Rumennik et al. |
| 6,777,749 B2 | 8/2004 | Rumennik et al. |
| 6,781,198 B2 | 8/2004 | Disney |
| 6,787,437 B2 | 9/2004 | Rumennik et al. |
| 6,787,847 B2 | 9/2004 | Disney et al. |
| 6,798,020 B2 | 9/2004 | Disney et al. |
| 6,800,903 B2 | 10/2004 | Rumennik et al. |
| 6,815,293 B2 | 11/2004 | Disney et al. |
| 6,818,490 B2 | 11/2004 | Disney |
| 6,825,536 B2 | 11/2004 | Disney |
| 6,828,631 B2 | 12/2004 | Rumennik et al. |
| 6,838,346 B2 | 1/2005 | Disney |
| 6,865,093 B2 | 3/2005 | Disney |
| 6,882,005 B2 | 4/2005 | Disney et al. |
| 6,933,769 B2 | 8/2005 | Koelling |
| 6,987,299 B2 | 1/2006 | Disney et al. |
| 7,092,268 B2 | 8/2006 | George |
| 7,115,958 B2 | 10/2006 | Disney et al. |
| 7,135,748 B2 | 11/2006 | Balakrishnan |
| 7,193,402 B2 | 3/2007 | Lee et al. |
| 7,220,629 B2 | 5/2007 | Balakrishnan |
| 7,221,011 B2 | 5/2007 | Banerjee et al. |
| 7,221,128 B2 | 5/2007 | Usui et al. |
| 7,233,191 B2 | 6/2007 | Wang et al. |
| 7,253,042 B2 | 8/2007 | Disney |
| 7,253,059 B2 | 8/2007 | Balakrishnan |
| 7,295,451 B2 | 11/2007 | Donald |
| 7,301,389 B2 | 11/2007 | Soady |
| 7,335,944 B2 | 2/2008 | Banerjee |
| 7,348,830 B2 | 3/2008 | Debroux |
| 7,381,618 B2 | 6/2008 | Disney |
| 7,391,088 B2 | 6/2008 | Balakrishnan |
| 7,408,796 B2 | 8/2008 | Soldano |
| 7,459,366 B2 | 12/2008 | Banerjee |
| 7,468,536 B2 | 12/2008 | Parthasarathy |
| 7,494,875 B2 | 2/2009 | Disney |
| 7,557,406 B2 | 7/2009 | Parthasarathy |
| 7,585,719 B2 | 9/2009 | Balakrishnan |
| 7,595,523 B2 | 9/2009 | Parthasarathy et al. |
| 7,616,050 B2 | 11/2009 | Eckstein |
| 7,696,598 B2 | 4/2010 | Francis et al. |
| 7,741,788 B2 | 6/2010 | Ito et al. |
| 7,746,156 B1 | 6/2010 | Massie et al. |
| 7,760,524 B2 | 7/2010 | Matthews |
| 7,893,754 B1 | 2/2011 | Kung |
| 7,999,606 B2 | 8/2011 | Kung et al. |
| 8,115,457 B2 | 2/2012 | Balakrishnan et al. |
| 8,125,265 B2 | 2/2012 | Kung et al. |
| 8,278,994 B2 | 10/2012 | Kung et al. |
| 8,300,440 B2 | 10/2012 | Ho et al. |
| 8,373,356 B2 | 2/2013 | Shao et al. |
| 9,148,929 B2 | 9/2015 | Jiang et al. |
| 9,326,346 B2 * | 4/2016 | Catalano ............ H05B 33/0854 |
| 2001/0043480 A1 | 11/2001 | Shona |
| 2002/0125541 A1 | 9/2002 | Korec et al. |
| 2003/0201821 A1 | 10/2003 | Coady |
| 2004/0041622 A1 | 3/2004 | Wu |
| 2004/0061454 A1 | 4/2004 | Prasad |
| 2004/0109335 A1 | 6/2004 | Gan et al. |
| 2005/0035371 A1 | 2/2005 | Fujihira |
| 2005/0167749 A1 | 8/2005 | Disney |
| 2005/0212583 A1 | 9/2005 | Pai |
| 2005/0230745 A1 | 10/2005 | Fatemizadeh et al. |
| 2005/0242411 A1 | 11/2005 | Tso |
| 2006/0028779 A1 | 2/2006 | Bax et al. |
| 2007/0035286 A1 | 2/2007 | Lee et al. |
| 2007/0146020 A1 | 6/2007 | Williams |
| 2007/0211504 A1 | 9/2007 | Unkrich |
| 2008/0018261 A1 | 1/2008 | Kastner |
| 2008/0136350 A1 | 6/2008 | Tripathi et al. |
| 2008/0259653 A1 | 10/2008 | Baurle et al. |
| 2009/0016090 A1 | 1/2009 | Knight |
| 2009/0040795 A1 | 2/2009 | Park et al. |
| 2009/0120200 A1 | 5/2009 | Chakrabartty |
| 2009/0261790 A1 | 10/2009 | Arduini |
| 2010/0109561 A1 | 5/2010 | Chen et al. |
| 2011/0025278 A1 | 2/2011 | Balakrishnan et al. |
| 2011/0149615 A1 | 6/2011 | Matthews |
| 2012/0028083 A1 | 2/2012 | Jung |
| 2012/0028093 A1 | 2/2012 | Jung |
| 2012/0074896 A1 | 3/2012 | Lui et al. |
| 2013/0020964 A1 | 1/2013 | Nuhfer et al. |
| 2014/0340065 A1 | 11/2014 | Svorc et al. |
| 2015/0123573 A1 * | 5/2015 | Hu ..................... H05B 33/0842 315/307 |

OTHER PUBLICATIONS

Maleis: "Full-Wave Rectifier for CMOS IC chip". Reg. No. H64, May 6, 1986.

* cited by examiner

THERMAL PROTECTION FOR LED BLEEDER IN FAULT CONDITION

TECHNICAL FIELD

The present disclosure relates generally to circuits for driving light-emitting diodes (LEDs); more specifically, it relates to bleeder circuits included in a LED driver.

BACKGROUND

LED lighting has become popular in the industry due to the many advantages that this technology provides. For example, LEDs typically have a longer lifespan, pose fewer hazards, and provide increased visual appeal when compared to other lighting technologies, such as compact fluorescent lamp (CFL) or incandescent lighting technologies.

Often times, LED driver circuits are configured with a dimming functionality that provides variable light output. One known technique that has been used for analog LED dimming is phase-angle dimming, which may be implemented using either leading-edge or trailing-edge phase-control. A TRIAC circuit is commonly used to perform this type of phase-angle dimming; it operates by delaying the beginning of each half-cycle of alternating current (ac) power, or trimming the end of each half-cycle of ac power. By delaying the beginning of each half-cycle, or trimming the end of each half-cycle, the amount of power delivered to the load (e.g., a string of LEDs) is reduced, thereby producing a dimming effect in the light output of the LEDs. In many applications, the delay in the beginning of each half-cycle or trimming of the end of each half-cycle is not noticeable because the resulting variations in the phase-controlled line voltage and power delivered to the LEDs occur more quickly than can be perceived by the human eye.

Flickering in LEDs may result when they are driven by LED driver circuits having regulated power supplies that provide regulated current and voltage to the LEDs from ac power lines. Unless the regulated power supplies that drive the LEDs are designed to recognize and respond to voltage signals from TRIAC dimming circuitry in a desirable way, the TRIAC dimming circuitry can produce non-ideal results, such as limited dimming range, flickering, blinking, and/or color shifting in the LEDs.

Part of the difficulty in using TRIAC dimming circuitry with LEDs is due to the characteristic of the TRIAC, which is a semiconductor component that acts as a controlled ac switch. The TRIAC behaves as an open switch to an ac voltage until it receives a trigger signal at a control terminal, causing the switch to close. The switch remains closed as long as the current through the switch is above a value referred to as the "holding current." Most incandescent lamps draw more than the minimum holding current from the ac power source to enable reliable and consistent operation of a TRIAC. However, the relatively low currents drawn by LEDs from efficient power supplies may not meet the minimum holding currents required to keep the TRIAC conducting for reliable operation. As a result, the TRIAC may trigger inconsistently. In addition, due to the inrush current charging the input capacitance and because of the relatively large impedance that the LEDs present to the input line, a significant ringing may occur whenever the TRIAC turns on. This ringing may cause even more undesirable behavior as the TRIAC current may fall to zero and turn off the LED load, resulting in a flickering effect.

To combat these problems, conventional LED drivers typically rely on sinking additional current drawn by a dummy load or bleeder circuit to supplement the current drawn by the LEDs in order to draw a sufficient amount of current to keep the TRIAC conducting reliably after it is triggered. One drawback of conventional bleeder circuits is that certain fault conditions in the LED driver may be interpreted by the bleeder circuits as the deficiency of the load current, thus causing the bleeder circuit to draw unusually high currents. This may result in a permanent thermal failure.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
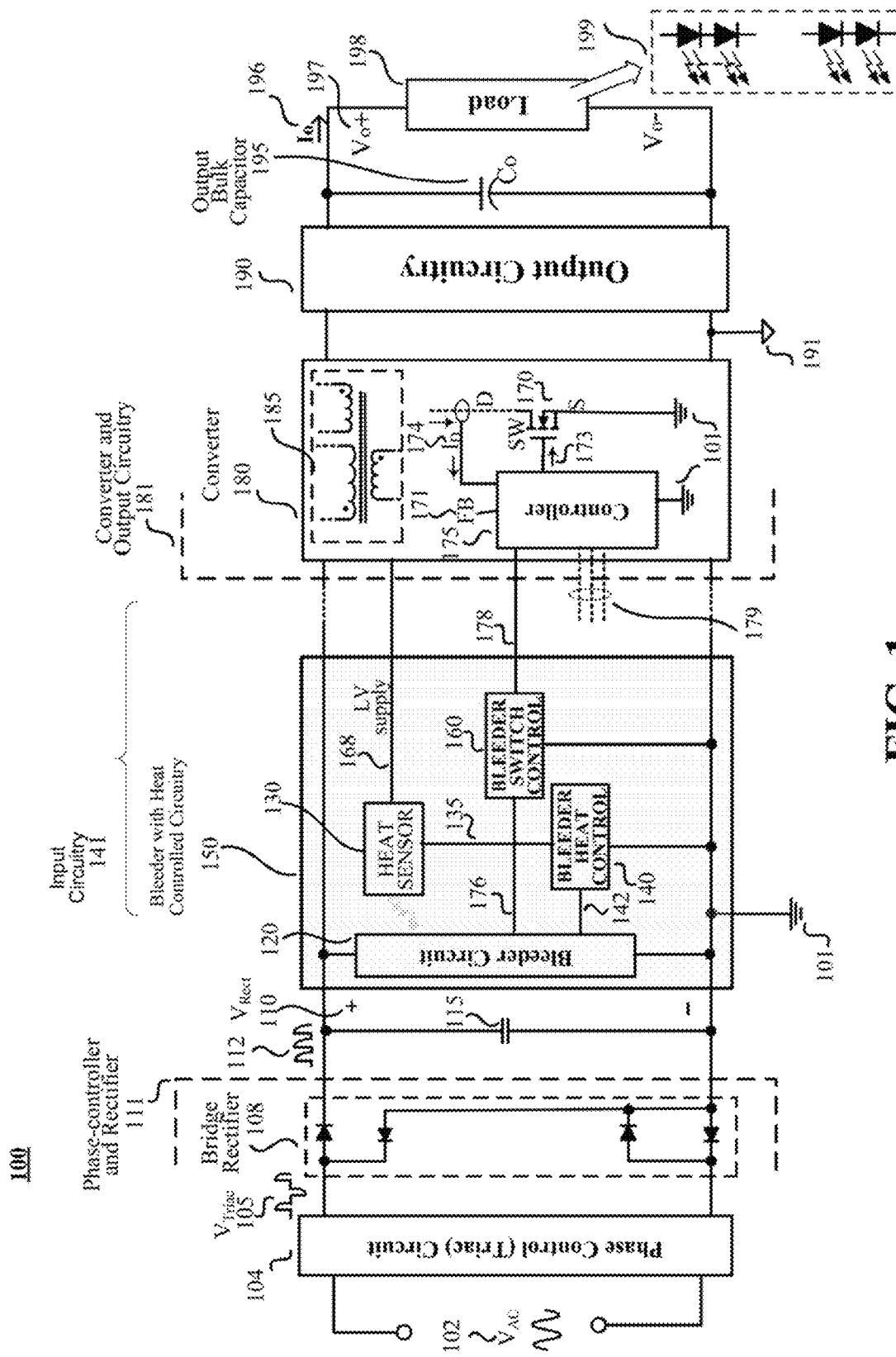
FIG. 1 is a circuit block diagram of an example offline LED driver which includes a TRIAC phase control dimmer and bleeder circuitry.

Corresponding reference characters indicate corresponding components throughout the several views of the drawings. Skilled artisans will appreciate that elements in the figures are illustrated for simplicity and clarity. In addition, it is appreciated that the figures provided herewith are for explanation purposes to persons ordinarily skilled in the art.

DETAILED DESCRIPTION

In the following description numerous specific details are set forth, such as device types, voltages, component values, configurations, etc., in order to provide a thorough understanding of the embodiments described. However, persons having ordinary skill in the relevant arts will appreciate that these specific details may not be needed to practice the embodiments described. It is further appreciated that well known circuit structures and elements have not been described in detail, or have been shown in block diagram form, in order to avoid obscuring the embodiments described.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. Particular features, structures or characteristics may be included in an integrated circuit, an electronic circuit, a combinational logic circuit, or other suitable components that provide the described functionality.

In the context of the present application, when a transistor is in an "off state" or "off" the transistor does not substantially conduct current. Conversely, when a transistor is in an "on state" or "on" the transistor is able to substantially conduct current. By way of example, in one embodiment, a transistor comprises an N-channel metal-oxide-semiconductor field-effect transistor (NMOS) with a voltage being supported between the first terminal, a drain, and the second terminal, a source. The MOSFET comprises a switch that is driven by a control circuit. In one embodiment, a bipolar transistor (BJT) comprises an NPN transistor having collector, base, and emitter terminals. For purposes of this disclosure, "ground" or "ground potential" refers to a reference voltage or potential against which all other voltages or potentials of an electronic circuit or Integrated circuit (IC) are defined or measured.

A TRIAC (triode for alternating current) is a three terminal electronic component that conducts current bi-directionally, i.e., in both directions when triggered. A TRIAC includes a first anode, a second anode, and a gate. The first and second anodes are commonly referred to as main terminals. A TRIAC may be triggered by either a positive or negative current applied to the gate. Applying a trigger at a controlled phase angle of the alternating current in the main circuit allows control of the average current flowing into a load (i.e., phase control).

The present disclosure is directed to LED driver circuits that include either an inactive RC bleeder or an active closed-loop controlled bleeder circuit. Circuitry is included for sensing excessive temperature in a bleeder dissipative element, and for decoupling the bleeder circuit components to protect the bleeder and the LED driver circuit from damage or failure.

FIG. 1 is a circuit block diagram of an example offline LED driver 100 having input circuitry 141, which includes a bleeder circuit 120, a heat sensor 130, a bleeder heat control element 140, and a bleeder switch control element 150. Positive and negative input terminals or nodes of bleeder circuit 120 are coupled to phase control and rectification circuitry 111, which, in one embodiment, includes a TRIAC circuit 104 coupled to the AC line $V_{AC}$ 102, an optional electromagnetic interference (EMI) filter 115 (e.g., a capacitor) and bridge rectifier 108. TRIAC circuit 104 provides phase control dimming. The output of TRIAC circuit 104 is a voltage waveform $V_{Triac}$ 105.

As shown, heat sensor 130 receives a low voltage supply signal 168 from converter 180 and outputs a heat sense signal 135. Bleeder heat control element 140 receives heat sense signal 135 and generates a heat control signal 142, which is input to bleeder circuit 120. Bleeder switch control element 160 is shown receiving signal 178 from controller 175 of converter 180. In response, bleeder switch control element 160 generates a signal 176 to control an active bleeder switch module of bleeder circuit 120. In converter 180, controller 175 also generates signal 173 to control converter switch 170 in response to various control signals, i.e., switch current $I_D$ 174, feedback signal FB 171, and other signals 179 that may regulate transfer of energy to output circuitry 190.

Positive and negative input terminals of bleeder circuit 120 are coupled to phase control and rectification circuitry 111, which, in one embodiment, includes a TRIAC circuit 104 coupled to the AC line $V_{AC}$ 102, small filter capacitance 115 and bridge rectifier 108. TRIAC circuit 104 provides phase control dimming. The output of TRIAC circuit 104 is a voltage waveform $V_{TRIAC}$ 105.

Output terminals of input circuitry 141 are coupled to corresponding input terminals of converter and output circuitry 181. It is appreciated that in certain implementations input circuitry 141 may include additional circuits, depending on the design requirements of the LED driver. Additional circuitry may include an EMI filter, input sense/detect circuitry, damper and inductive or capacitive filters, which are not shown to avoid obscuring the present disclosure.

Continuing with FIG. 1, converter and output circuitry 181 includes a converter 180 which may be an isolated or non-isolated Flyback, Buck, Boost, Buck-boost, or any conventional converter topology commonly used in LED drivers. The energy transfer element of block 180 is symbolically shown as the coupled inductor 185. The switching element of block 180 is illustrated as a metal-oxide-semiconductor field-effect transistor (MOSFET) 170. A controller 175 controls the switching cycles of MOSFET 170. Controller 175 also controls transfer of energy from input to the output of converter 180 through energy transfer element 185. The controlled power from the output of converter 180 passes through output circuitry 190, which may include rectification and filter circuitry, and is applied through voltage $V_o$ 197 and current $I_o$ 196 to load 198 (e.g., LED array 199) across bulk output capacitor Co 195. Capacitor 195 is used to reduce ripple in current 196 applied to load 198.

In one implementation, TRIAC circuit 104 may apply leading-edge or trailing-edge phase control as explained above to produce a phase-controlled signal $V_{Triac}$ 105 and the rectified signal $V_{Rect}$ 110 with a symbolic waveform 112. By removing a portion of each half-cycle of the input ac line signal $V_{AC}$ 102 through the TRIAC circuit 104, the amount of power delivered to output across load 198 is reduced and the light output by LED array 199 appears dimmed.

In the example of FIG. 1, controller 175 is coupled to control the MOSFET 170 via a control signal 173. In this manner, MOSFET 170 may be switched between an ON state (i.e., a state in which current flows between the drain and source) and an OFF state (i.e., a state in which no current flows) thereby controlling the amount of energy transferred from the input to the output of converter 180 through energy transfer element 185. In one embodiment, controller 175 controls switching of MOSFET 170 based on one or more sensed signals, such as current detect signal $I_D$ 174, feedback signal 176, and/or various signals 179 representative of functions/parameters of the LED driver 100.

Figure 2A:
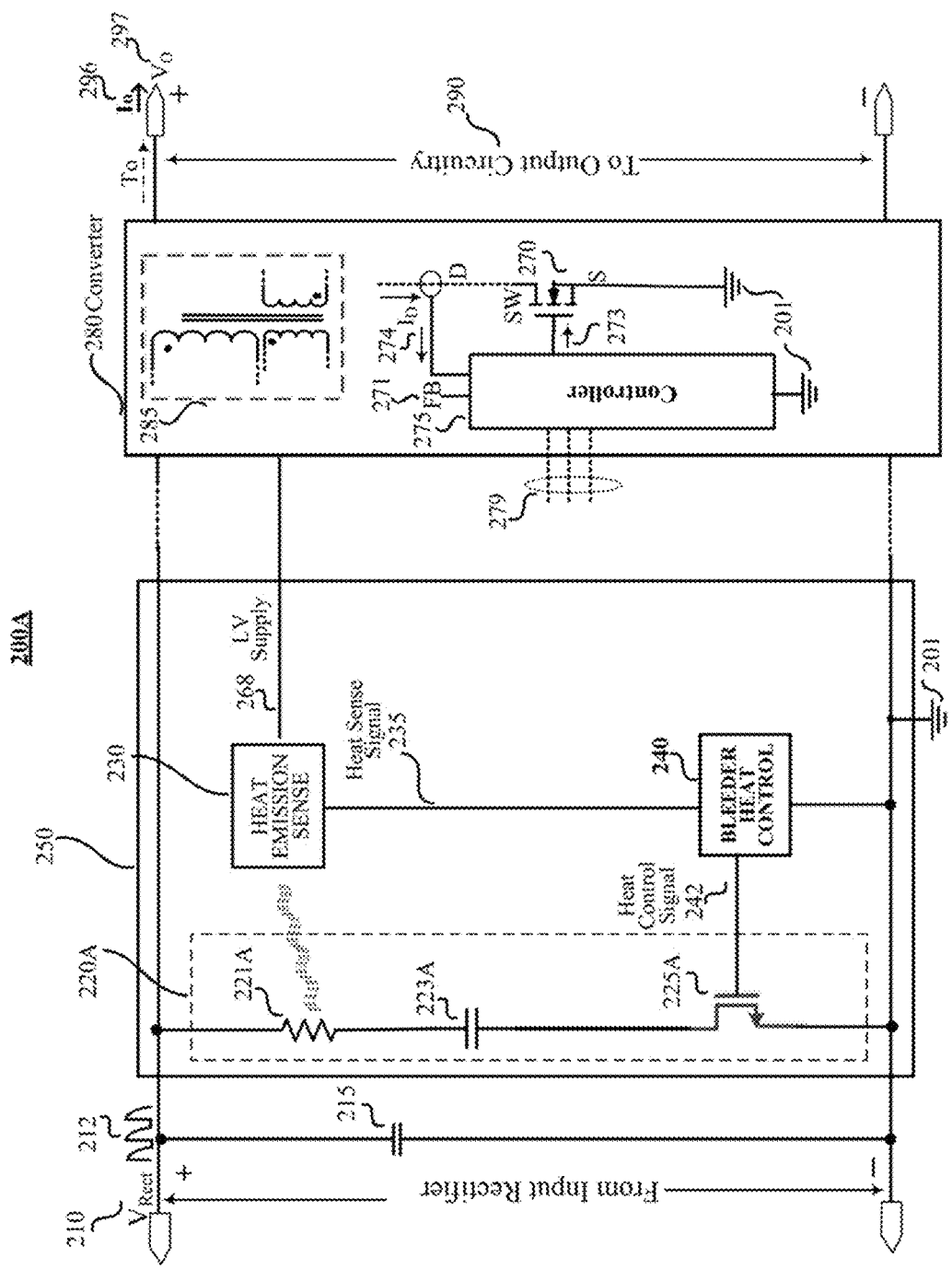
FIG. 2A is a circuit schematic diagram of an example RC inactive bleeder circuit that provides thermal protection.
Figure 2B:
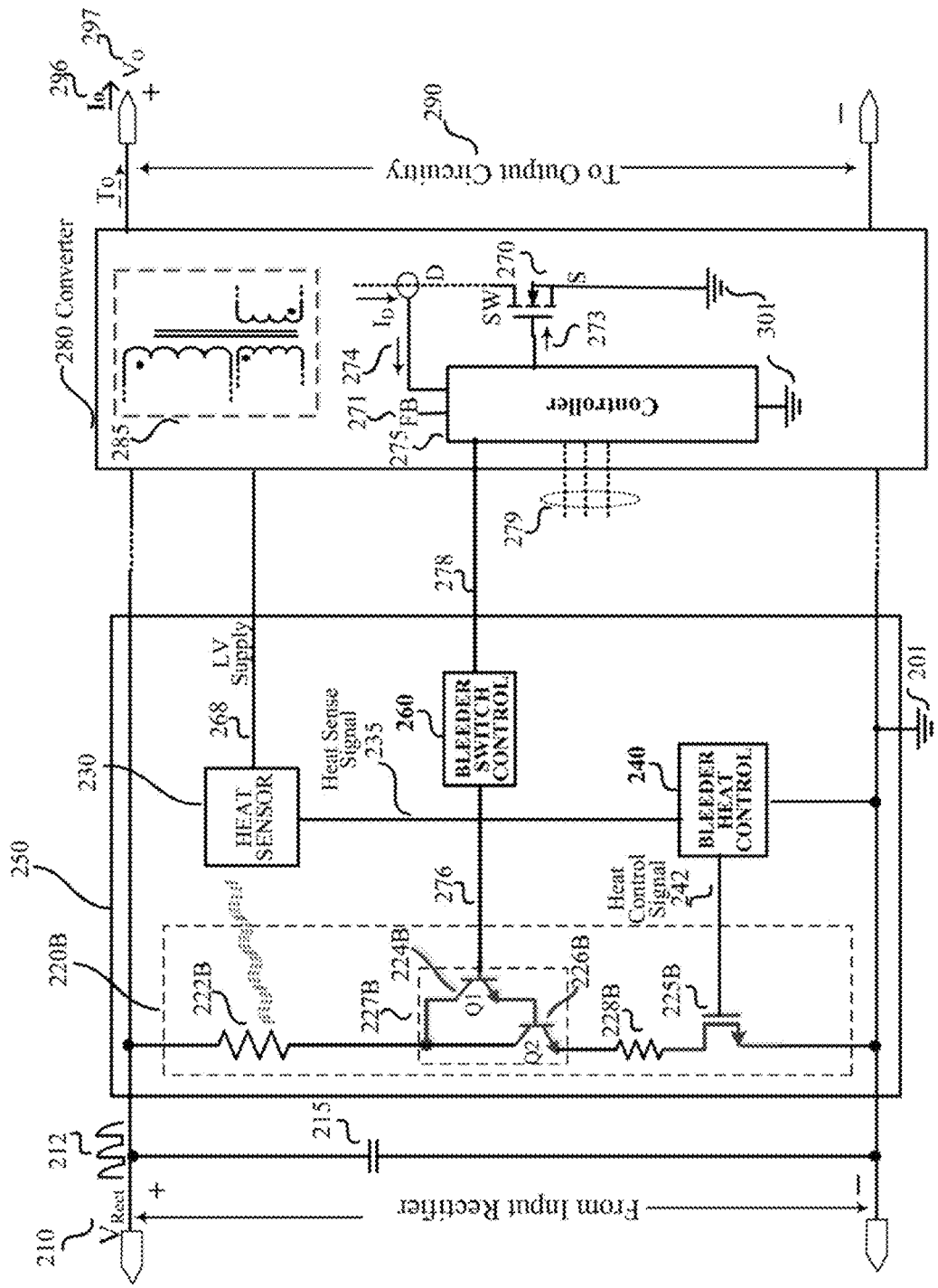
FIG. 2B is a circuit schematic diagram of an example active bleeder circuit that provides thermal protection.
Figure 2C:
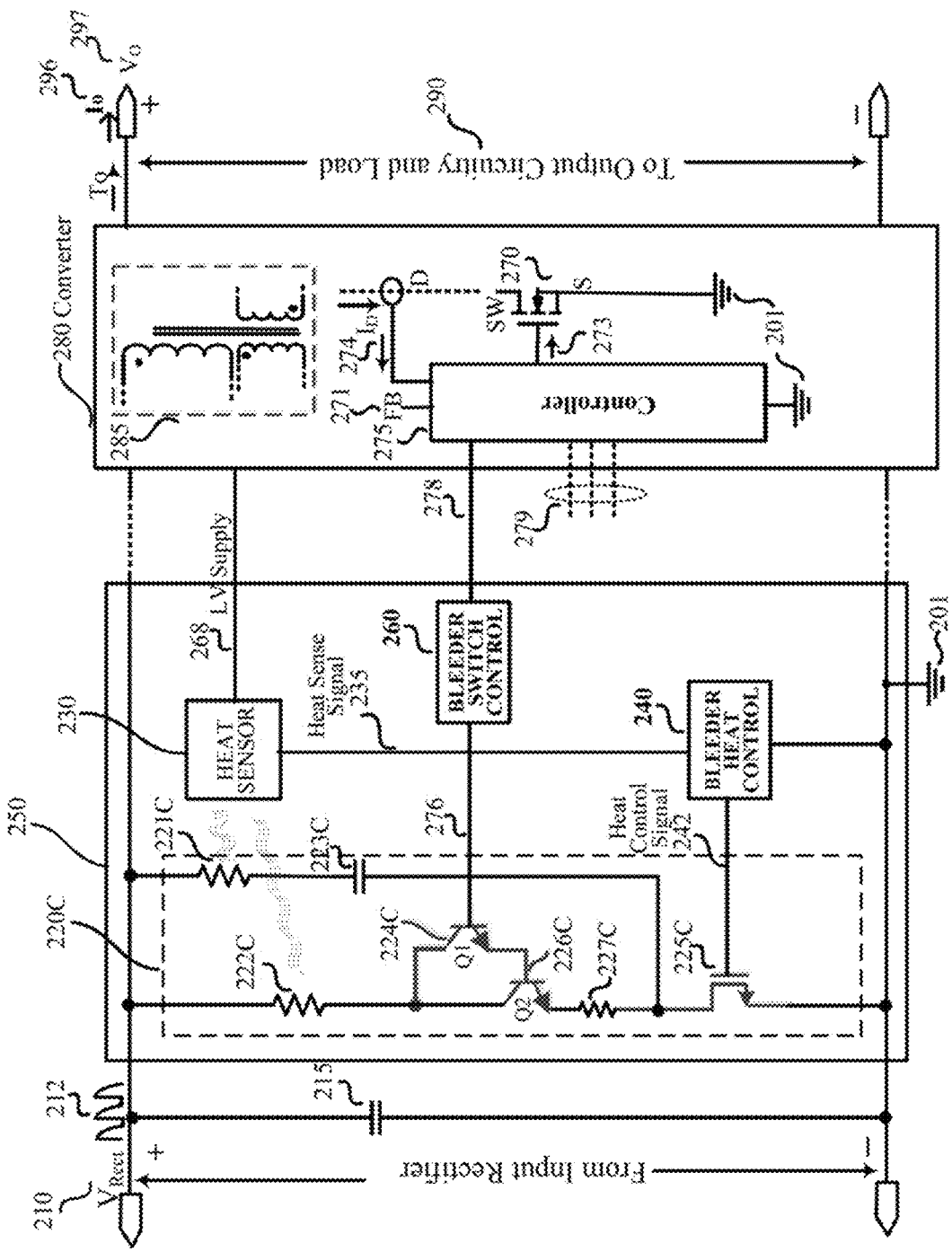
FIG. 2C is a circuit schematic diagram of an example RC inactive plus an active bleeder circuit that provides thermal protection.

FIGS. 2A-C illustrates three example circuit schematic diagrams of bleeder circuits that provide thermal protection for an LED driver. FIG. 2A shows an example RC inactive bleeder circuit; FIG. 2B shows an example active bleeder circuit; and FIG. 2C shows an example RC inactive plus an active bleeder circuit. In each of these examples, the bleeder circuitry may be protected by a closed loop of temperature/heat control when a fault condition event occurs in the LED driver that produces excessive current flowing through the bleeder circuit. Example fault condition events may include an output short circuit with dimmer connected or LED string one-by-one failing short circuit resulting in a lower LED load voltage and lowered output power; an opened bias winding rectifier diode wherein output power drops resulting in increased power dissipation in the bleeder circuit; high internal ambient temperature operation; misfiring of the dimmer; and misdetection of conduction angle through the controller that may result in excessive current through the bleeder circuit.

In the case of an active bleeder circuit, a shorting fault of the bleeder transistor may produce excessive bleeder current through the bleeder circuit.

By way of example, in the case of inactive RC bleeder circuit 250 shown in FIG. 2A, a shorting fault of bleeder capacitor 222A may cause high dissipation current in resistor 221A. Excessive bleeder current flow through resistor 222A is avoided by sensing the heat emitted by resistor 221A utilizing a heat emission sensor 230 physically located nearby resistor 221A on the PCB. As shown, heat emission sensor 230 is powered by a low voltage supply line 268 provided by converter 280. In response to heat produced by resistor 221A, heat emission sensor 230 generates a heat sense signal 235 coupled to a bleeder heat control element 240. In response to signal 235, bleeder heat control element 240 generates a heat control signal 242 that drives a switching element (also referred to as a bleeder decoupling switch). In the example of FIG. 2A, switching element 225A is implemented as a field-effect transistor (FET) 225A. Practitioners in the art will appreciate that other types of known switching element utilized as the bleeder decoupling switch. That is, although switching elements 225A/B/C are respectively shown implemented in FIGS. 2A/B/C as a field-effect transistors (FETs) other types of semiconductor switches, or other types of switching elements, may be used in different embodiments.

In operation, when the sensed heat from resistor 221A rises above a certain level, heat control signal operates to turn off FET 225A. In this manner, bleeder circuitry 220A is temporarily and safely decoupled from the remaining circuitry of LED driver 200A until the fault condition is cleared and the temperature of resistor 221A has dropped below a predetermined (safe) level.

Note that the example circuit block diagram of FIG. 2A shows inactive RC bleeder circuit 220A coupled across an input filter capacitor 215 from the rectified voltage $V_{Rect}$ 210 (with symbolic waveform 212) to ground 201. Bleeder circuit 220A is coupled in between the output port of input rectifier $V_{Rect}$ 210 and the input port to converter 280. Energy transfer element 185 of converter 180 is coupled to output circuitry 290, which provides output voltage $V_o$ 297 and output current to 296. As shown in the example of FIG. 1, inactive RC bleeder circuit 220A includes series-connected resistor 221A, capacitor 223A and FET 225A coupled across rectified voltage bus $V_{Rect}$ 210.

Persons of skill in the art will appreciate that in one embodiment controller 275 of converter 280 may receive signals such as a current detect signal $I_D$ 274, feedback signal FB 271, and other feed forward signals 279 from the input circuitry of LED driver 220A to control and regulate transfer of energy to the output 290, e.g., regulating output voltage $V_o$ 297 and output current $I_o$ 296.

FIG. 2B shows the same LED driver 220A of FIG. 2A except with an active bleeder circuit 220B instead of inactive RC bleeder circuit 220A. In the event of a single fault condition event such as that described above, excessive bleeder current through resistor 222B) is prevented by a heat control loop.

Active bleeder circuit 220B includes series-connected resistor 222B, a bleeder switch module 227B, resistor 228B, and FET 225B coupled across input filter capacitor 215. Bleeder switch module 227B includes BJTs 224B (Q1) and 226B (Q2) configured as a Darington pair, with resistor 228B being coupled to the emitter of BJT 226B. The base of BJT 224B is coupled to receive a logic level signal 276 produced by bleeder switch control element 260. Bleeder switch control element 260, in turn, has its input coupled to receive signal 278 from controller 275.

Like resistor 222A (FIG. 2A), resistor 222B functions as a heat dissipative element in bleeder circuit 220B. As such, resistor 222B is located nearby heat sensor 230 on the PCB. Heat sensor 230 receives a low voltage LV supply 268 (e.g., through an auxiliary supply on energy transfer element 285 of converter 280) and generates heat sense signal 235 responsive to the amount of heat sensed (i.e., temperature of resistor 228). Heat sense signal 235 is input to bleeder heat control element 240, which produces heat control signal 242 in response thereto. Heat control signal 242 controls conduction of FET 225B. That is, in response to high heat levels sensed by heat sensor 268, FET 225B is turned off via heat control signal 242. In this manner, bleeder heat control element 240 decouples bleeder circuit 220B from the remaining circuitry of the LED driver thereby preventing excessive current damage to bleeder circuit 220B in the case of some fault condition event.

It is known to someone skilled in the art that based on topology of converter 280 the controller 275 may receive control signals such as current $I_D$ 274 through converter switch SW 270, feedback signal FB 271 and more feed forward signals 279 from input circuitry of the LED driver to controls switching of converter switch SW 270 and regulate transfer of energy from input to the output 290 for a regulated output voltage $V_o$ 297 or output current $I_o$ 296.

FIG. 2C is a circuit schematic diagram of an example RC inactive plus an active bleeder circuit that provides thermal protection. The schematic shown in FIG. 2C included the same LED driver circuitry of FIGS. 2A & 2B, but with bleeder circuitry 220C that includes an active bleeder as well as an inactive RC bleeder. As shown, both bleeders are protected by heat control loop in the event of a fault condition such as described above.

Note that in the schematic diagram of FIG. 2C the left-hand section of the LED driver provides a rectified voltage $V_{Rect}$ 210 output from the input stage, phase-control (e.g., TRIAC 104 of FIG. 1) and rectifier bridge (e.g., bridge 108 of FIG. 1). The right-hand section of the LED driver shows a converter 280 coupled to output circuitry 290 that provides the regulated output voltage $V_o$ 297 or output current $I_o$ 296.

In the embodiment of FIG. 2C rectified and phase controlled input voltage $V_{Rect}$ 210, shown by symbolic waveform 212, is applied across an input filter capacitor 215 to the bleeder circuitry 220C that includes multiple bleeders; e.g., an active bleeders and a RC inactive bleeder. Bleeder circuitry is protected against a failure condition event through the use of a heat emission sensor 230 located on PCB in vicinity of the heat dissipating resistors 222C & 221C. First and second bleeder currents may flow through resistors 222C and 221C, respectively. The active bleeder portion of circuitry 220C includes a bleeder switch module shown as a Darlington pair configuration of transistors 224C (Q1) and 226C (Q2) with a small resistor 227C coupled to the emitter of transistor 226C. Transistor 224C is controlled by a logic level signal 276 produced by bleeder switch control element 260 in response to signal 278 output from controller 275 of converter 280.

Persons of ordinary skill in the art understand that controller 275 may receive control signals such as current signal $I_D$ 274 through converter switch SW 270, feedback signal FB 276, and one or more feed forward signals 279 from input circuitry of the LED driver. These control signals help to control switching of converter switch SW 270 and regulate transfer of energy from input to output 290 for a regulated output voltage $V_o$ 297 or output current $I_o$ 296.

The inactive RC bleeder portion of circuitry 220C consists of heat dissipative resistor 221C coupled in series with a capacitor 223C. The inactive RC bleeder is coupled in parallel across the active bleeder, with both the inactive and active bleeders being coupled in series with decoupling switch (FET) 225C. Heat sensor 230 is powered by low voltage LV supply 268 from energy transfer element 285 of converter 280. Heat sensor 230 generates heat sense signal 235 in response to sensing heat (temperature rise) dissipated from resistors 222C and 221C. Decoupling switch 225C is controlled by heat control signal 242 which is produced by bleeder heat control element 240 in response to heat sense signal 235.

In the example of FIG. 2C, a temperature rise in one or both resistors 221C and 222C exceeding a threshold value results in a heat sense signal that causes bleeder heat control element 240 to decouple bleeder circuitry 220C (active plus inactive bleeders) by turning off switch 225C. In other words, any fault condition event that results in excessive heat dissipation in bleeder circuitry 220C due to high first and/or second bleeder currents causes bleeder heat control element 240 to output heat control signal 242 which decouples bleeder circuitry 220C from the LED driver.

It is appreciated that in alternative embodiments bleeder circuitry 220C may comprise one or more active bleeders combined with one or more than one inactive bleeders, each configured in parallel. Furthermore, still other embodiments may utilize separate heat sensor control loops; one for each heat dissipating resistor, with each loop being protected through individual decoupling switches.

Figure 3:
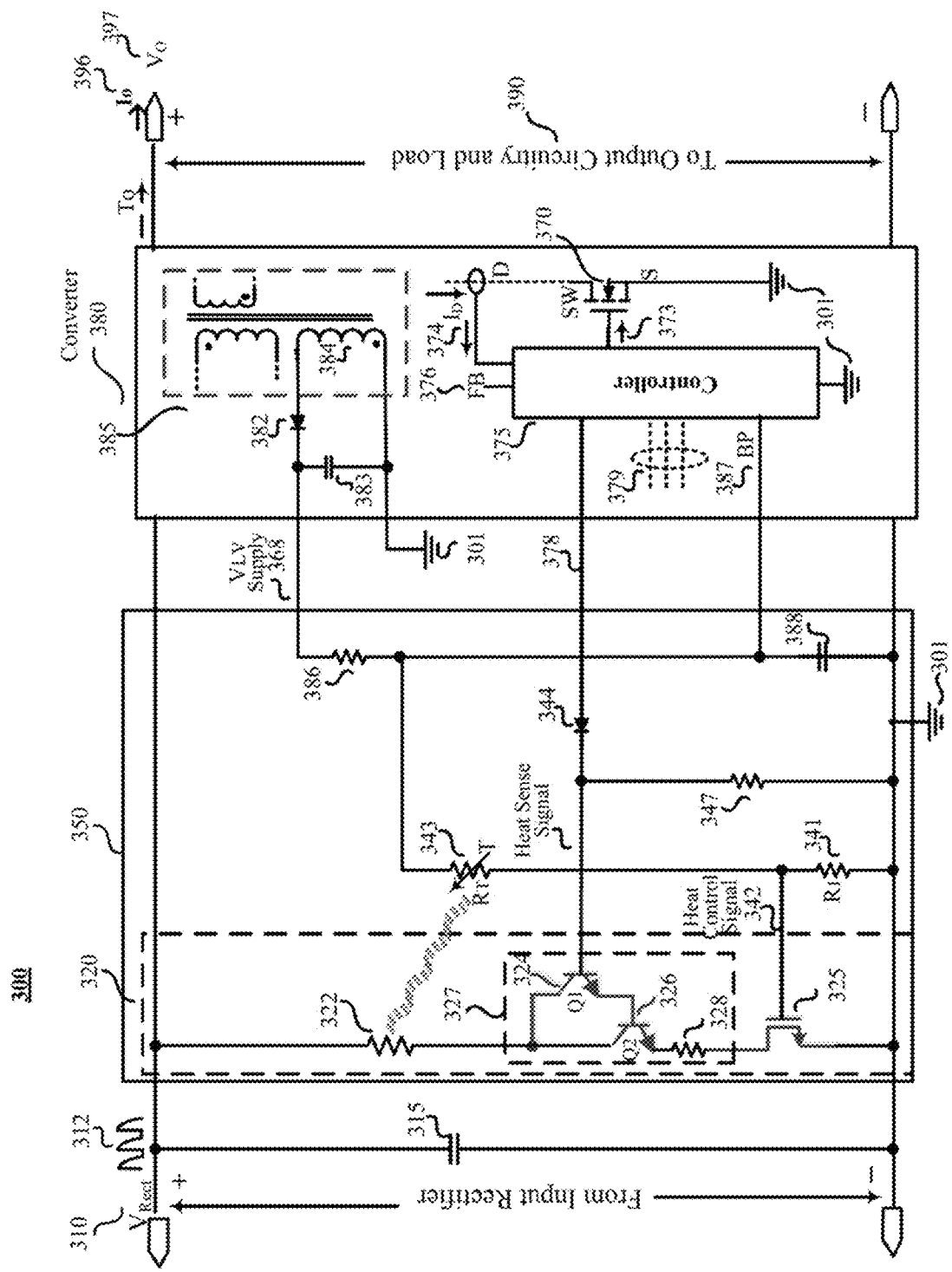
FIG. 3 is a detailed circuit schematic diagram of another example active bleeder circuit that provides thermal protection.

FIG. 3 is a detailed circuit schematic diagram of another example active bleeder circuit that provides thermal protection. As shown, LED driver 300 includes an active bleeder circuit 320 with emitted heat sensing and thermal protection substantially similar to that shown in FIG. 2B. Circuit block 350 includes bleeder, heat sense and thermal protection functionality as described above. On the input side, circuit block 350 may be coupled to a TRIAC (e.g., TRIAC 104 of FIG. 1) and to a rectifier (e.g., bridge rectifier 108 in FIG. 1) that generates a phase-controlled rectified bus voltage 310 with symbolic waveform 312. On the output side, circuit block 350 is coupled to converter 380 and, through output circuitry 390 to a load. In this manner, regulated output voltage Vo 397 or output current Io 396 is applied to the load (e.g., LED array 199 of FIG. 1).

It is appreciated that converter 380 may be of any common/conventional topology known in the LED driver industry, e.g., isolated or non-isolated Flyback, Buck, Boost, Buck-boost, etc. In converter 380 of FIG. 3 the energy transfer element may consist of coupled inductors 385; the converter switch is illustrated as a MOSFET 370, and controller 375 functions to control switching cycles of converter switch 370 to transfer energy from input to the output of converter through the energy transfer element 385.

Controller 375 is coupled to control converter switch 370 through a control signal 373 to regulate amount of energy transferred through energy transfer element 385 from input to output of converter 380. Controller 375 may control switching of converter switch 370 based on sensed signals, such as converter switch current to 374, feedback signal 376 and some feed forward signals 379 representative of the LED driver functional parameters. The supply voltage on bypass pin BP 387 of controller 375 may be generated through an auxiliary winding on the energy transfer element 385 in reference to ground 301. The induced voltage in auxiliary winding 384 is rectified through diode 382 to charge the bypass capacitor 383. The low voltage LV supply 368 through resistor 386 is applied across capacitor 388 to the bypass pin 387 of controller 375.

In the example of FIG. 3, bleeder circuit 320 is shown as an active bleeder. Alternatively, it may comprise any type of active or inactive bleeder, or may include multiple active and inactive bleeders as described in conjunction with FIGS. 2A-2C. Bleeder switch module 327 is shown as a Darlington pair configuration consisting of transistors 324 (Q1) and 326 (Q2) with a small resistor 328 coupled to the emitter of Q2. Bleeder switch module 327 is controlled through a logic level signal 378 provided by controller 375. It is appreciated that rectifier diode 344 is used to prevent any current return through base of transistor 324 to the controller when switch 325 is open. Note that resistor 347 is coupled between the base of transistor 324 and ground 301.

Resistor 322 is ideally physically located on the PCB nearby thermistor (thermal resistor) $R_T$ 343. Thermistor 343 functions as a heat sensor. Practitioners understand that a thermistor is a type of resistor whose resistance is dependent on temperature, more so than in standard resistors.

Continuing with the example of FIG. 3, low voltage LV supply 368 from converter 380, in addition of supplying power to the controller BP pin 387, is also coupled to a resistive divider consisting of thermistor 343 and low-side resistor 341. A heat control signal 342 is generated by the resistive divider (resistors 343 and 341) to control/command the on-state or off-state of the FET 325.

In one embodiment, thermistor 343 is a PTC (positive thermal coefficient) thermistor having a resistance value that increases in response to temperature. Temperature increase may be caused by any fault condition that increases bleeder current flowing through resistor 322 which is physically located on the PCB nearby thermistor 343. In normal condition for ambient temperature (e.g., 25° C.) the resistance values of the selected thermistor $R_T$ 343 and R1 341 provide a heat control signal 342 above the on-state threshold of FET switch 325 to keep it in on-state, thereby keeping bleeder circuit 320 coupled to the LED driver. However, any fault condition causing an excessive bleeder current through resistor 322, the temperature increase sensed by thermistor 322 may cause the resistance value $R_T$ of thermistor 322 to increase dramatically (from $R_T1$ to $R_T2$, $R_T2 \gg R_T1$; e.g., 10-100 times). The increase in resistance of thermistor 343 changes the voltage divider ratio, i.e., from R1/(R1+$R_T1$) to R1/(R1+$R_T2$), thus reducing the amplitude of heat control signal 342 to below the on-state threshold of FET switch 325. When heat control signal 342 drops below the threshold voltage of FET switch 325, FET switch 325 turns off, thereby decoupling bleeder circuit 320 from the LED driver at the positive input terminal.

Persons of skill in the art will appreciate that in an alternative embodiment, thermistor 343 may be substituted with an ordinary resistor, and resistor 341 may be replaced with a NTC (negative thermal coefficient) thermistor having a resistance value that decreases with temperature. The NTC resistor is positioned nearby resistor 322 such that when the temperature of resistor 322 exceeds a predetermined threshold, the heat control signal drops below the threshold voltage of FET 325, thereby turning off FET 325 and decoupling bleeder circuit 320 from the LED driver.

Figure 4C:
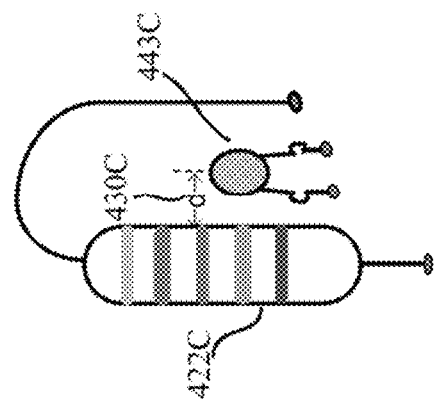
FIGS. 4A-4C illustrates example thermistors for insertion on a printed circuit board (PCB) in the vicinity of a heat dissipative component.
Figure 4B:
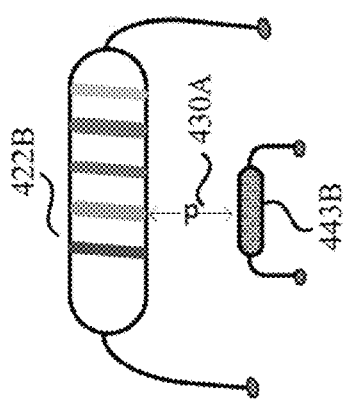
Figure 4A:
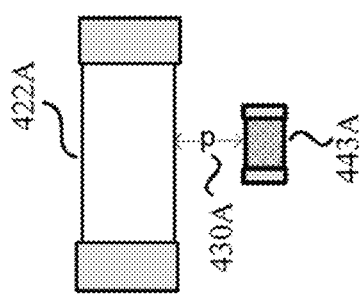

FIGS. 4A-4C illustrate three different example thermistors for insertion on a printed circuit board (PCB) in the vicinity of a heat dissipative component, e.g., a resistor. FIGS. 4A-4C show three thermistor packages with different types of mountings. FIG. 4A shows surface mount type components; FIG. 4B is for axial mount type components; and FIG. 4C illustrates radial mount type components. In each case, the location of the thermistor around the heat dissipative resistor on the PCB may be defined for a predetermined distance range, d (430A, 430B or 430C), indicating a maximum and minimum surface distance between thermistor and the dissipative resistor. The surface distance, d, of thermistor and dissipative resistor, in combination with the resistor values of the resistive divider ($R_T$ 343 and R1 341 in FIG. 3) allows the circuit designer to adjust heat control signal 342 for controlling the conduction of FET 325.

As shown, FIG. 4A is an example surface mount bleeder dissipative resistor 422A and a surface mount thermistor 443A physically separated by a surface distance 430A. FIG. 4B shows an example axial bleeder dissipative resistor 422B and an axial thermistor 443B physically separated by a surface distance 430B. FIG. 4C shows an example radial mount bleeder dissipative resistor 422C and a radial thermistor 443C physically separated by a surface distance 430C.

The above description of illustrated example embodiments, including what is described in the Abstract, are not intended to be exhaustive or to be limitation to the precise forms or structures disclosed. While specific embodiments and examples of the subject matter described herein are for illustrative purposes, various equivalent modifications are possible without departing from the broader spirit and scope of the present invention. Indeed, it is appreciated that the specific example currents, voltages, resistances, capacitances, etc., are provided for explanation purposes and that other values may also be employed in other embodiments and examples in accordance with the teachings of the present invention.

I claim:

1. A bleeder circuit for use with a driver circuit, the driver circuit including input circuitry that receives an ac input signal and outputs a rectified voltage signal at a positive terminal, the driver circuit further including converter and output circuitry operably coupled to a plurality of light-emitting diodes (LEDs), the bleeder circuit comprising:
    a first resistor coupled to the positive terminal;
    a heat sensor positioned to detect an increase in temperature of the first resistor, the heat sensor producing a heat sense signal in response thereto;
    a bleeder heat controller coupled to receive the heat sense signal and produce a heat control signal in response thereto,
    a switching device coupled to receive the heat control signal, the switching device controlling a first bleeder current flowing through the first resistor, the switching device turning off in response to the temperature of the first resistor exceeding a predetermined threshold, thereby decoupling the bleeder circuit from the driver circuit.

2. The bleeder circuit of claim 1 further comprising a first capacitor coupled between the first resistor and the switching device.

3. The bleeder circuit of claim 1 wherein the switching device is a field-effect transistor (FET) having a drain, a source, and a gate, the gate being coupled to receive the heat control signal.

4. The bleeder circuit of claim 1 further comprising an active bleeder switch module coupled between the first resistor and the switching device, the active bleeder switch module being controlled by a logic signal provided by a controller of the converter.

5. The bleeder circuit of claim 4 wherein the active bleeder switch module comprises first and second bipolar transistors (BJTs) configured as a Darlington pair, the collectors of the first and second BJTs being coupled to the first resistor, the emitter of the second BJT being coupled to the switching device, and the base of the first BJT being coupled to receive the logic signal.

6. The bleeder circuit of claim 4 further comprising a second resistor and a second capacitor coupled in series between the positive terminal and the switching device such that the switching device controls a second bleeder current flowing through the second resistor, the heat sensor being positioned to detect an increase in temperature of the second resistor, the heat control signal being produced by the heat sensor in response to an increase in the temperature of either the first or second resistors, or both.

7. The bleeder circuit of claim 1 wherein the heat sensor comprises a thermistor and the bleeder heat controller comprises a third resistor, the thermistor and third resistor comprising a voltage divider that produces the heat control signal.

8. The bleeder circuit of claim 7 wherein the thermistor has positive thermal coefficient.

9. The bleeder circuit of claim 7 wherein the thermistor has negative thermal coefficient.

10. The bleeder circuit of claim 7 wherein the converter and output circuitry includes an energy transfer element, the thermistor being coupled to a voltage supply line of the energy transfer element.

* * * * *

UNITED STATES PATENT AND TRADEMARK OFFICE
CERTIFICATE OF CORRECTION

PATENT NO. : 9,629,218 B1
APPLICATION NO. : 14/980180
DATED : April 18, 2017
INVENTOR(S) : Jose Requinton Del Carmen, Jr.

Page 1 of 2

It is certified that error appears in the above-identified patent and that said Letters Patent is hereby corrected as shown below:

In the Specification

Column 3, Lines 37-41 read:
"FIG. 1 is a circuit block diagram of an example offline LED driver 100 having input circuitry 141, which includes a bleeder circuit 120, a heat sensor 130, a bleeder heat control element 140, and a bleeder switch control element 150."

It should read:
"FIG. 1 is a circuit block diagram of an example offline LED driver 100 having input circuitry 141, which includes a bleeder circuit 120, a heat sensor 130, a bleeder heat control element 140, and a bleeder switch control element 160."

Column 4, Lines 44-48 read:
"In one embodiment, controller 175 controls switching of MOSFET 170 based on one or more sensed signals, such as current detect signal ID 174, feedback signal 176, and/or various signals 179 representative of functions/parameters of the LED driver 100."

It should read:
"In one embodiment, controller 175 controls switching of MOSFET 170 based on one or more sensed signals, such as current detect signal ID 174, feedback signal 171, and/or various signals 179 representative of functions/parameters of the LED driver 100."

Column 5, Lines 4-11 read:
"By way of example, in the case of inactive RC bleeder circuit 250 shown in FIG. 2A, a shorting fault of bleeder capacitor 222A may cause high dissipation current in resistor 221A. Excessive bleeder current flow through resistor 222A is avoided by sensing the heat emitted by resistor 221A utilizing a heat emission sensor 230 physically located nearby resistor 221A on the PCB."

Signed and Sealed this
Seventeenth Day of October, 2017

Joseph Matal
*Performing the Functions and Duties of the
Under Secretary of Commerce for Intellectual Property and
Director of the United States Patent and Trademark Office*

It should read:
"By way of example, in the case of inactive RC bleeder circuit 250 shown in FIG. 2A, a shorting fault of bleeder capacitor 223A may cause high dissipation current in resistor 221A. Excessive bleeder current flow through resistor 221A is avoided by sensing the heat emitted by resistor 221A utilizing a heat emission sensor 230 physically located nearby resistor 221A on the PCB."

Column 6, Lines 62-66 read:
"Persons of ordinary skill in the art understand that controller 275 may receive control signals such as current signal ID 274 through converter switch SW 270, feedback signal FB 276, and one or more feed forward signals 279 from input circuitry of the LED driver."

It should read:
"Persons of ordinary skill in the art understand that controller 275 may receive control signals such as current signal ID 274 through converter switch SW 270, feedback signal FB 271, and one or more feed forward signals 279 from input circuitry of the LED driver."

Column 8, Lines 40-45 read:
"However, any fault condition causing an excessive bleeder current through resistor 322, the temperature increase sensed by thermistor 322 may cause the resistance value RT of thermistor 322 to increase dramatically (from RT1 to RT2, RT2 >> RT1; e.g., 10-100 times)."

It should read:
"However, any fault condition causing an excessive bleeder current through resistor 322, the temperature increase sensed by thermistor 343 may cause the resistance value RT of thermistor 343 to increase dramatically (from RT1 to RT2, RT2 >> RT1; e.g., 10-100 times)."